(12) United States Patent
Chambers et al.

(10) Patent No.: US 12,655,048 B2

(45) Date of Patent: Jun. 16, 2026

(54) ANAEROBIC DIGESTER WITH SELF-DELIVERY OF ACCUMULATED SOLIDS

(71) Applicant: VIRGINIA TECH INTELLECTUAL PROPERTIES, INC., Blacksburg, VA (US)

(72) Inventors: Benjamin Chambers, Blacksburg, VA (US); Zachary D. Dowell, Christiansburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 604 days.

(21) Appl. No.: 18/085,769

(22) Filed: Dec. 21, 2022

(65) Prior Publication Data

US 2023/0192518 A1     Jun. 22, 2023

Related U.S. Application Data

(60) Provisional application No. 63/292,866, filed on Dec. 22, 2021.

(51) Int. Cl.
| | |
|---|---|
| *C02F 3/28* | (2023.01) |
| *C02F 11/04* | (2006.01) |
| C02F 103/20 | (2006.01) |

(52) U.S. Cl.
CPC .......... C02F 3/2846 (2013.01); C02F 3/2893 (2013.01); C02F 11/04 (2013.01);
(Continued)

(58) Field of Classification Search
CPC ...... C02F 3/2846; C02F 3/2893; C02F 11/04; C02F 2103/20; C02F 2203/006; C02F 2209/005; C02F 2303/14
(Continued)

(56) References Cited

U.S. PATENT DOCUMENTS

| | | | | |
|---|---|---|---|---|
| 6,478,963 B1 * | 11/2002 | Rossmanith | .......... | C02F 3/2846 210/197 |
| 2003/0150803 A1 * | 8/2003 | Nishimura | .............. | C02F 11/02 210/623 |

(Continued)

FOREIGN PATENT DOCUMENTS

| | | | | |
|---|---|---|---|---|
| HU | 0101555 A2 * | 9/2001 | | |
| JP | 3621967 B2 * | 2/2005 | ............ | C02F 3/2873 |

(Continued)

OTHER PUBLICATIONS

Machine-generated English translation of HU 0101555, generated on Apr. 17, 2025.*

(Continued)

*Primary Examiner* — Fred Prince

(74) *Attorney, Agent, or Firm* — Thomas | Horstemeyer, LLP

(57) ABSTRACT

Self-delivering digester 100s with self-delivery of accumulated solids are described. A primary waste vessel includes a feeding port for kitchen waste, and an upper output component that connects to a top of the primary waste vessel. The upper output component includes a gas output path from a top of the upper output component, and a floating solids output path that delivers floating solids that overflow from the top of the primary waste vessel to a secondary vessel thereby preventing clogging of the gas output path.

20 Claims, 4 Drawing Sheets

(52) U.S. Cl.
CPC .... *C02F 2103/20* (2013.01); *C02F 2203/006* (2013.01); *C02F 2209/005* (2013.01); *C02F 2303/14* (2013.01)

(58) Field of Classification Search
USPC .......................... 210/603, 259, 260, 261, 262
See application file for complete search history.

(56) References Cited

U.S. PATENT DOCUMENTS

| | | | | |
|---|---|---|---|---|
| 2004/0256299 A1* | 12/2004 | Herring, Sr. | .............. | C02F 9/00 210/167.3 |
| 2006/0118484 A1* | 6/2006 | Langhans | ............... | C02F 3/223 210/603 |
| 2010/0119879 A1* | 5/2010 | Girguis | .............. | H01M 8/1016 429/2 |

FOREIGN PATENT DOCUMENTS

| | | | | |
|---|---|---|---|---|
| KR | 20020078169 | A | * | 10/2002 |
| KR | 101769988 | B1 | * | 8/2017 |
| KR | 101792120 | B1 | * | 10/2017 |
| KR | 20190034744 | A | * | 4/2019 |

OTHER PUBLICATIONS

Machine-generated English translation of KR 101769988, generated on Apr. 17, 2025.*
Machine-generated English translation of KR 20020078169, generated on Apr. 17, 2025.*
Machine-generated English translation of KR 20190034744, generated on Apr. 17, 2025.*
Machine-generated English translation of KR 101792120, generated on Apr. 17, 2025.*
Machine-generated English translation of JP 3621967, generated on Sep. 29, 2025.*

* cited by examiner

ANAEROBIC DIGESTER WITH SELF-DELIVERY OF ACCUMULATED SOLIDS

CROSS-REFERENCE TO RELATED APPLICATIONS

This application claims benefit of and priority to U.S. Provisional Application No. 63/292,866, filed on Dec. 22, 2021 and entitled "HOUSEHOLD ANAEROBIC DIGESTER DESIGNED FOR SELF-DELIVERY OF ACCUMULATED SOLIDS," which is hereby incorporated herein by reference in its entirety.

BACKGROUND

For decades, household digester technology has been plagued by clogging from accumulation of lignin-based floating solids, resulting in high maintenance requirements. In the developing world, large digesters periodically require draining when floating solids accumulate to the point at which the vessel becomes inoperable. After the messy job of draining the contents, the digester must be re-inoculated with bacteria and go through the lengthy process of re-establishing the bacterial ecosystem needed for successful operation. Digester designs a tenth the size of these are currently in R&D, destined for the U.S. market. These smaller digesters, in the range of 50-100 gallons, have the ability to operate effectively, while reducing issues with aesthetics and heating requirements. However, clogging in these digesters takes place much more quickly than that of larger digesters.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
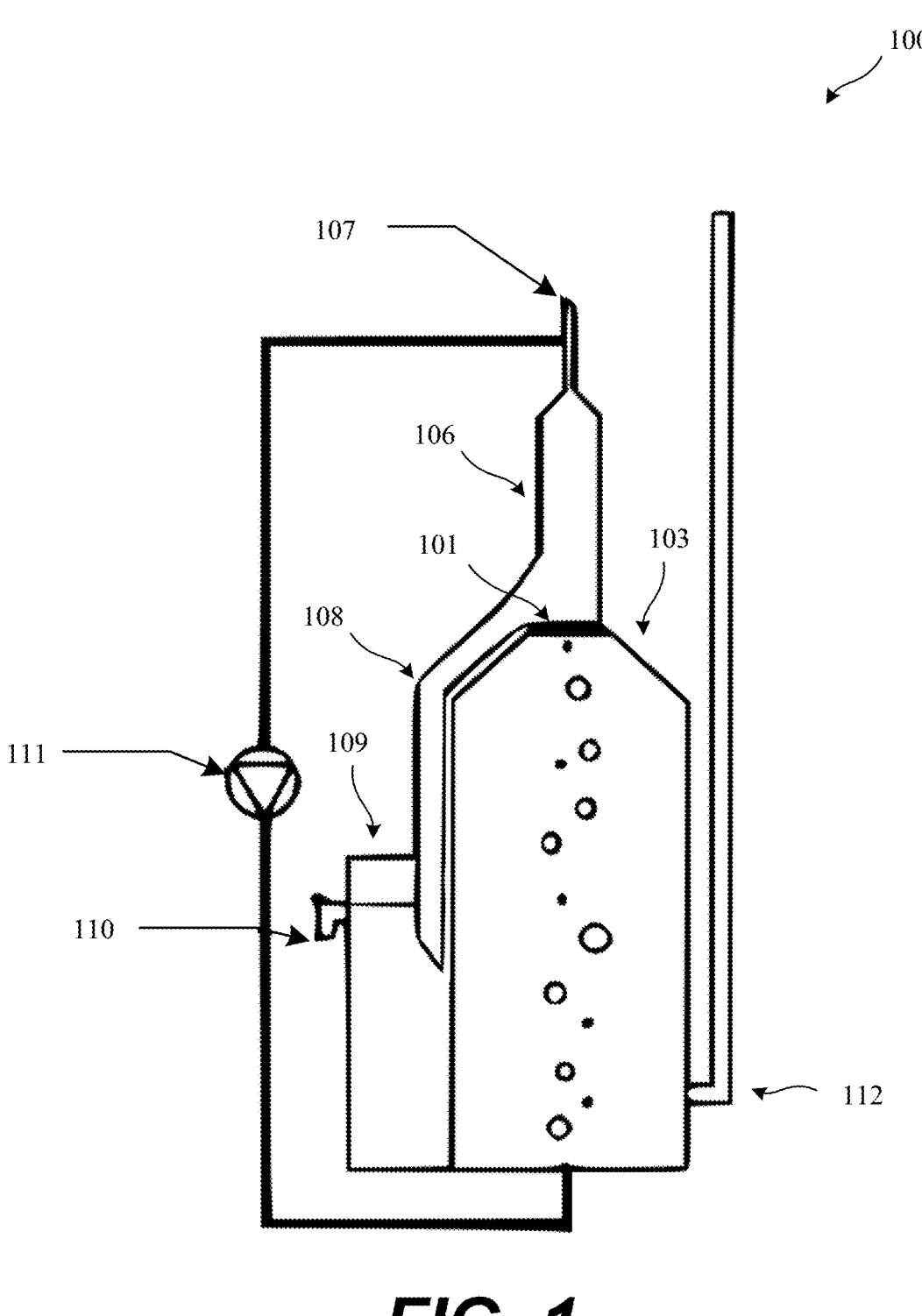
FIG. 1 is a drawing of an example self-delivering digester with self-delivery of accumulated solids, according to the present disclosure.

The anaerobic digesters described herein self-deliver accumulated solids and sunken sludge for easy periodic removal by the end-user. This prevents having to periodically drain the digester and restart operation. Digesters are complex eco-systems with both mechanical and biological components. While R&D companies further their designs, there are few who understand how quickly solids will accumulate in small household digesters. Fossil fuel use and improper disposal of food waste (FW) are urgent global concerns. Fossil fuels are the largest contributor of humancreated carbon emissions, and they are a finite source of energy with limited supplies. Worldwide oil reserves are expected to last 50 years, while coal reserves are expected to last approximately 110 years. While the fossil fuel issue has been a mainstream environmental topic for some time, there has been growing visibility of the significant environmental impacts of improper FW disposal.

The Food and Agricultural Organization claims that if FW were looked upon as a country, it would account for the third-highest carbon generator, behind the U.S. and China. Over 60 million tons of FW was generated in the U.S. in 2018, composing the largest waste stream that enters landfills. The largest amount of generated FW comes from households and restaurants. A recent study conducted at Pennsylvania State University found that 31.9% of food purchased by U.S. households can be wasted annually. Disposal through incineration produces harmful environmental emissions, as does landfilling. Moreover, landfilling results in leachate contaminating water supplies.

In 2015, the U.S. set a goal to cut food waste and loss in half by the year 2030. However, the most recent report from the EPA on the impacts of U.S. Food Waste was recently released in November of 2021 and new evidence suggests that progress towards this goal can be greatly lacking. The report inferred the need for more research to explore factors that help in reaching this goal.

The process of anaerobic digestion (AD) turns food waste into fuel and fertilizer, so this technology can contribute into responsible food waste treatment and reduction of fossil fuel use. The process of AD can occur naturally in marshes and ponds, where organic matter can be decomposed in the absence of oxygen. Humans have designed and operated various anaerobic digesters as well.

Organic waste can be placed within an airtight vessel where it can be consumed by anaerobic bacteria, and the byproduct can be renewable biogas (methane) and high-quality fertilizer. The gas can be used for electricity generation, engine operation, water heating, and cooking. Municipalities dealing with remediation of FW are using financial resources for disposal when this waste could be looked upon as fuel and fertilizer through the process of AD.

European residences are required to sort their FW for municipal pickup as standard practice, and infrastructure can be in place for large-scale treatment through AD. However, residential pickup and transport of FW to for municipal treatment, as well as transport of digestate equate to the largest expenditure in this process. Jurisdictions in the U.S. are slowly implementing mandatory food waste separation. Vermont has even incurred fines for citizens who not properly sort their food waste and place it in the municipally supplied bin for weekly pickup. While other states begin to mandate food waste collection, obvious complaints from citizens relate to dealing with food waste separation and smells that reveal themselves from the collection bins, particularly in the summer.

With EPA and USDA's ambitious goals of 50% food waste reduction set for the year 2030, the U.S. must look to all options for dealing with the FW problem. Rural and suburban areas outside of cities are of particular concern, where transportation fees may inhibit economically sound large-scale pickup and processing. Environmental issues require new ways of thinking and investigation into alternative contributors towards meeting deep decarbonization goals where social resistance to food waste separation can be overcome through proper design of household digesters.

Household digesters have many benefits as compared to other residential energy generating technologies. One benefit is that household digesters can be not just a way to create energy; it can also be a method of waste disposal—with high nitrogen fertilizer being the end-product. Another attribute of household digestion can be that some wastes can be digested that are not typically composted. More than 35% of FW from homes can be in the form of meat, dairy, fats, and oils. Residences can make use of these wastes in digesters to create fertilizer and biogas, while those who compost would typically put these wastes in their trash destined for landfills.

While household digesters may not be a sole solution to the food waste problem, the technology has the potential to treat food waste at its point of source in U.S. households, where tipping fees related to large-scale municipal treatment can be eliminated. While household digesters may not be a panacea to existing waste and fossil fuel issues, the technology has the ability to produce impacts for people who reside in suburbs and rural areas where food waste pickup may not become a future option in the near future- and the benefits and convenience of household digesters outweigh the benefits and hardships of backyard composting.

Household digesters can also be helpful for those who seek the technology for resilience in disaster preparedness, because of the fuel that can be created. In the future, some governmental actors may implement for some who do not participate in food waste collection programs and there may be homeowners who would prefer to reap the benefits from their time sorting kitchen food. A properly designed household digester eliminates social issues involving smell and sorting of food waste.

Household digesters can be employed to create cooking fuel for many years in developing countries. Technology dissemination has taken place due to high price and lack of availability of fossil fuels, and health concerns related to burning wood as a cooking fuel. Varied levels of success have been found in different parts of the world.

Most existing household digesters in the US were home-made systems employed by serious biogas hobbyists. Perhaps only a couple hundred have been in operation at any one time in the U.S. But as of recently a household digester product has entered the U.S. market that has a growing population of adopters.

Some types of household digesters can be used in tropical warm-weather developing countries. For example, some baglike digesters can include a gas holder, a slurry inlet, a slurry outlet, and a bigas outlet. This bag style digester with a design resembling bag digesters can be less expensive and can be employed in warm-weathered developing countries. However, large 400 gallon sized products can clog when fed manure and even when fed food waste. Furthermore, this style of digester can be intended for a tropical climate and the ideal temperature of 95 F for optimal digester operation provides for a situation where adopters in most U.S. climates will only have successful operation in the summer months.

However, many household digesters can present serious operational issues. For example, with each successive feeding of some existing digesters, a layer of waste at the top will first rise, and floating lignin-based and other processed solids can clog the gas pipe at the top. This layer becomes encrusted and dry at the top, since it can be attached to the gas volume at the top of the tank. After weeks of feedings take place and the solid layer begins to accumulate. As the digester can be continually fed, the solid layer begins to grow towards the bottom of the tank, clogging the outlet pipe. Existing technologies can use a large gas space at the top of the vessels, whether being flexible bag style or cylindrical. These and other design issues can cause existing technologies to frequently suffer from clogging of pipes.

As a result, there is a need for more efficient and effective household digester systems. The present disclosure describes mechanisms that enable a more efficient and effective household digester system with self-delivery of accumulated solids along with further improvements.

FIG. 1 illustrates a self-delivering digester 100 with self-delivery of solids 101. The self-delivering digester 100 can include a primary vessel or primary waste vessel 103, a top-mounted or upper output component 106, and a secondary treatment vessel 109. The physical structure of the self-delivering digester 100 can enable automatic or self-delivery of accumulated solids including floating solids to the secondary treatment vessel 109.

The primary waste vessel 103 can include a feeding port 112 for kitchen waste. For example, the feeding port 112 can connect to and be fed kitchen waste from a garbage disposal such as a sink-mounted garbage disposal. The primary waste vessel 103 can in some examples have a smaller upper outlet than its widest point. In other words, the primary waste vessel 103 can taper to a tapered or rounded top that connects to an upper output component 106.

The upper output component 106 can include a gas output path 107 and a solids output path 108. The structure of the upper output component 106 and its position at a top of the primary waste vessel 103 can provide automatic or self-delivery of accumulated solids including the shown floating solids 101 through the solids output path 108. This can clear the path for gas, preventing clogging of the gas output path 107. As a result, the upper output component 106 can be considered a self-clearing gas output component as well as an integrated or dual output component for solids and gas through respective output paths of the integrated upper output component 106.

The secondary treatment vessel 109 can include an effluent output port 110 that allows emptying or draining of the secondary treatment vessel 109, for example, to a garden for fertilizer, or another external location. The overall design allows for the movement of floating solids 101 to be self-delivered from the effluent pipe. This self-delivering digester 100 provides no space for gas at the top of the primary waste vessel 103 where solids can accumulate, crust, and inhibit successful operation. Rather, the top of the primary waste vessel 103 is attached to the upper output component 106 that enables self-delivery of floating solids 101 as well as gas output and gas recirculation.

As can be seen, the upper output component 106 has a gas output path 107 as well as a gas recirculation path that connects to the gas recirculation pump 111. The gas recirculation pump 111 can pump all or a portion of the gas back into a primary gas recirculation port at the bottom of the primary waste vessel 103, which enables the methane and other gasses to mix and agitate the slurry in the primary waste vessel 103. Some examples can also include a secondary gas recirculation port at the bottom of the secondary treatment vessel 109, which enables the methane and other gasses to mix and agitate the slurry in the secondary treatment vessel 109. The overall design increases effective working volume of the digester, thus enabling it to be constructed smaller (such as 55 gallons as opposed to 100 gallon or 400 gallon designs).

Figure 2:
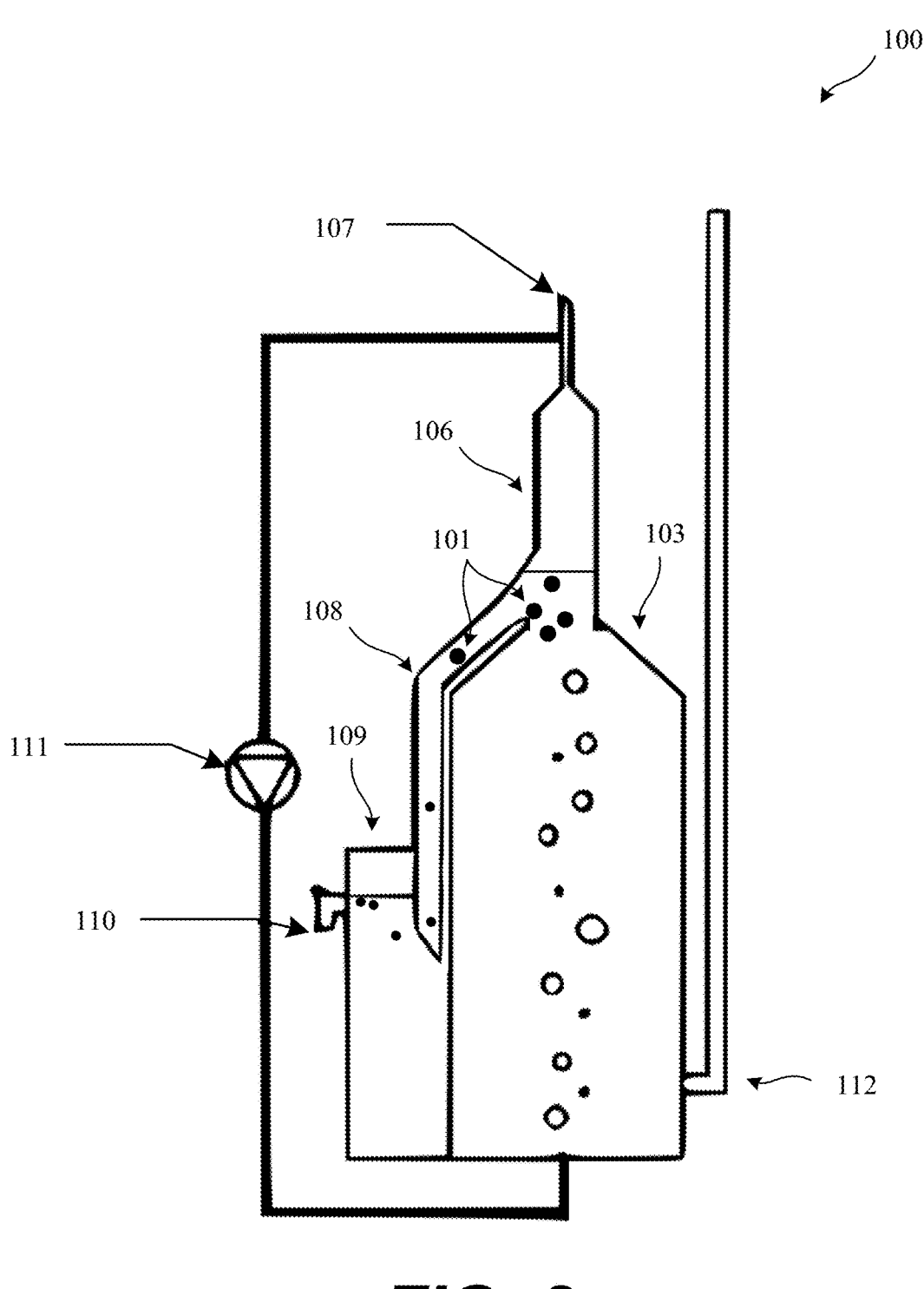
FIG. 2 is a drawing of another example self-delivering digester with self-delivery of accumulated solids, according to the present disclosure.

FIG. 2 illustrates how self-delivering digester 100 can dispel floating solids 101 into the secondary treatment vessel 109, for example, during feedings from a garbage disposal appliance in the kitchen sink. Allowing operators to feed their food waste into the sink disposal prevents them from having to store their food waste for municipal treatment. It can be convenient, and the disposal grinds the waste for easier digestion.

As can be seen from the design, the gas recirculation pump 111 can pump gas from the upper output component 106 back into a primary gas recirculation port at the bottom of the primary waste vessel 103. This can be for multiple reasons. One reason can be to create homogeneity in the tank and allow for faster processing of waste. A second reason can be for the bubbles generated by the gas pump to provide for momentum to push the solids out of the effluent port, into the solids output path 108 of the upper output component 106. The effluent can be captured in the secondary treatment vessel 109 along with the solids 101. A hydrophobic pipe coating can be applied prevent solids from sticking to the effluent pipe or solids output path 108 on their way down to the secondary treatment vessel 109.

Figure 3:
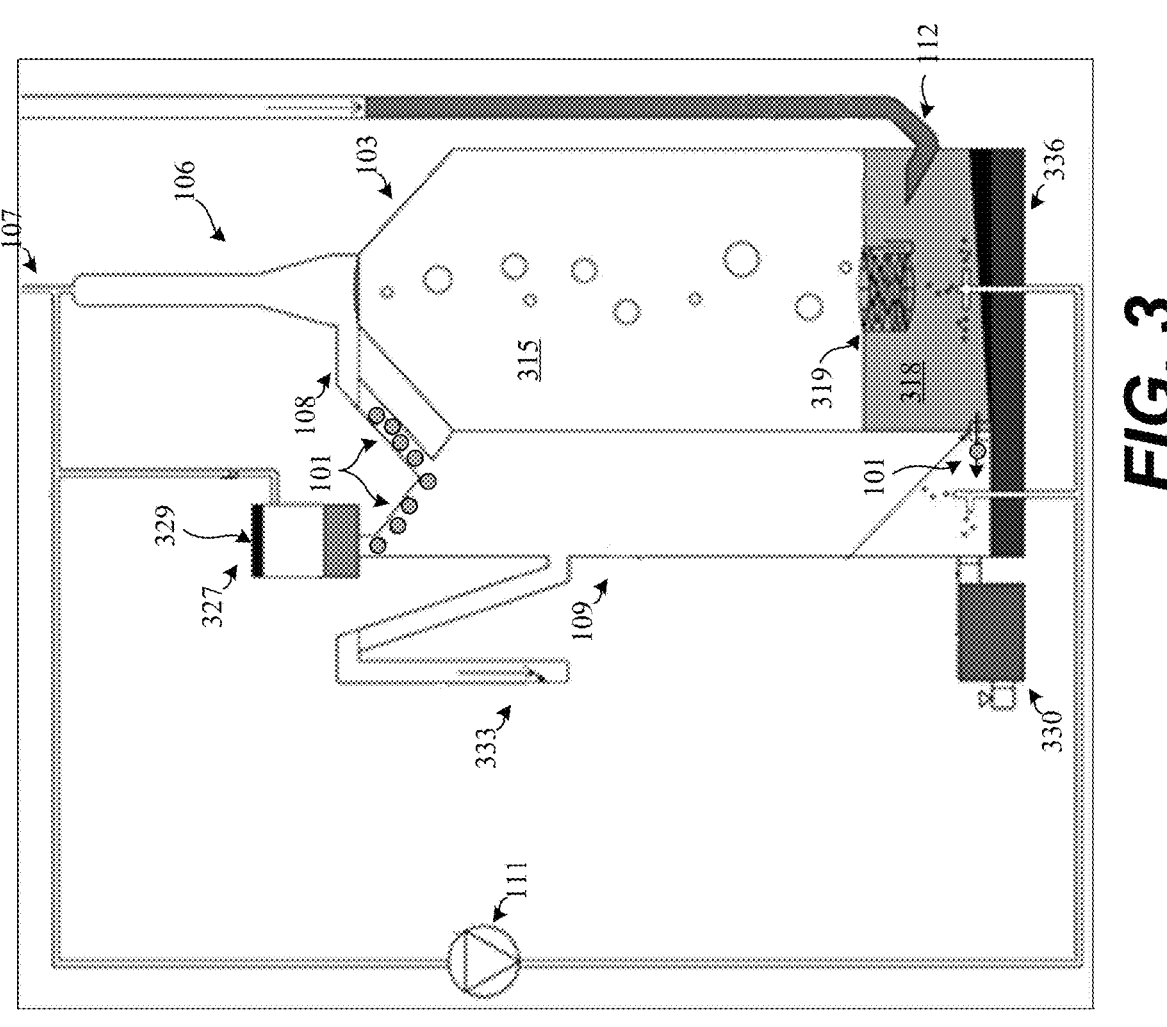
FIG. 3 is a drawing of another example of a self-delivering digester with self-delivery of accumulated solids, according to the present disclosure.

FIG. 3 illustrates another example of a self-delivering digester 100. This example of the self-delivering digester 100 can include a primary vessel or primary waste vessel 103, a top-mounted or upper output component 106, and a secondary treatment vessel 109. The physical structure of the self-delivering digester 100 can enable automatic or self-delivery of accumulated solids including floating solids 101 to the secondary treatment vessel 109. In some cases sunken solids 101 and sludge can be automatically self-delivered to the secondary treatment vessel 109.

The primary waste vessel 103 can include a feeding port 112 for kitchen waste. For example, the feeding port 112 can connect to and be fed kitchen waste from a garbage disposal such as a sink-mounted garbage disposal. The primary waste vessel 103 can in some examples have a smaller upper outlet than its widest point. In other words, the primary waste vessel 103 can taper to a tapered or rounded top that connects to an upper output component 106.

The primary waste vessel 103 can include an upper section 315 and a lower section 318. The upper section 315 and the lower section 318 can be connected through a packed bed 319. In some cases the packed bed 319 can reside in the lower section 318, and can provide a path from the lower section 318 to the upper section 315. The feeding port 112 can be in the lower section 318.

The packed bed 319 can include u-shaped inlet tube. The packed bed 319 in the bottom or lower section 318 of the primary waste vessel 103 or tank provides surface area for unprocessed solids to be captured and treated or processed by passage through the packed bed 319 prior to eventually passing into the upper section 315, into the secondary treatment vessel 109, and to the solid containment vessel or floating solids container 327, where solids can occasionally be removed by the user, on a schedule determined by their waste generation rate (e.g., bi-monthly). The packed bed 319 can include a hollow vessel that is filled with a packing material. The packing can be filled with small objects or any structured packing that can be designed to provide surface area for unprocessed solids to be captured, treated, and processed prior to floating into the upper section 315. The design also enables a gas space to develop around the packed bed 319. A U-tube within the lower section 318 serves to allow for the gas to accumulate and form pressure until a certain point and then release into the packed bed 319 and passively force solids into the upper part of the primary tank for eventual removal.

The upper output component 106 can include a gas output path 107 and a solids output path 108. The structure of the upper output component 106 and its position at a top of the primary waste vessel 103 can provide automatic or self-delivery of accumulated solids including floating solids through the solids output path 108. This can clear the path for gas, preventing clogging of the gas output path 107. As a result, the upper output component 106 can be considered a self-clearing gas output component as well as an integrated or dual output component for solids and gas through respective output paths of the integrated upper output component 106.

The secondary treatment vessel 109 can be connected to or include an upper collection container or floating solids container 327 at an upper output location. The secondary treatment vessel 109 can be connected to or include a lower collection container or sunken solids and other sludge container 330. The secondary treatment vessel 109 can also include a specially designed effluent output port 333 that is connected at an output connection point lower than the floating solids container 327, extends to a position higher than the output connection point, and in some cases extends downward from its highest position.

The floating solids container 327 can be periodically cleaned through a lid 329 or other cleaning access opening. When cleaned, this prevents clogging of the effluent output port 333. In some examples, the effluent port 333 can output to a sewer system or garden. The floating solids container 327 can have a transparent section such as a viewing port or lid, or the container itself can be transparent so that a level of floating solids can be seen. The floating solids container 327 can also include an electronic sensor or physical gauge that provides a visible indication of the level of floating solids. In the case of an electronic sensor, the sensor can provide floating solid level data to a controller. The controller can produce the indication such as triggering a light or updating display or user interface element.

The floating solids container 327 can include a secondary gas output path. The secondary gas output path can include a valve that is closeable to isolate the gas system from the upper collection container or floating solids container 327 when the cleaning access opening is opened. In some examples, the valve can include a manual valve that is manually operated to a closed position prior to opening the cleaning access opening. In other examples, the valve can include an electronically operated valve that is automatically closed by a controller in response to unlocking and/or opening the cleaning access opening. This can prevent gas from escaping from the gas system.

The sunken solids or sludge container 330 can be periodically cleaned through a valve, a lid or another cleaning access opening. The sludge container 330 can have a transparent section such as a viewing port or lid, or the container itself can be transparent so that a level of sunken solids or sludge can be seen. Sludge container 330 can also include an electronic sensor or physical gauge that provides a visible indication of the level of collected sludge. In the case of an electronic sensor, the sensor can provide floating solid level data to a controller. The controller can produce the indication such as triggering a light or updating display or user interface element.

The sludge in the primary vessel 103 can migrate to the secondary treatment vessel 109 through a sludge pathway or sludge port, and eventually into the sludge container 330 for easy removal. The sludge pathway or sludge port can be a lower port or opening between the primary vessel 103 and the secondary treatment vessel 109. This can include a two inch or other size pipe or hole, or another sized and shaped port or pathway, for example, in an integrated self-delivering digester 100 where the primary vessel 103 and the secondary treatment vessel 109 share a wall or a portion of a wall.

The sludge container 330 can include a cleaning valve, output valve, or another cleaning access opening. The output valve or opening can be automatically opened periodically if the opening is connected to a sewer system. In some cases, the output valve or opening can be opened, and water can be turned on to flush the sludge container 330 manually or automatically. The sludge container 330 can also include an isolation valve that is closeable to isolate the sludge container 330 from the secondary treatment vessel 109. In some cases, this sludge isolation valve can remain open even if the sludge container 330 is being cleaned, and in other cases, the sludge isolation valve can be closed during a cleaning operation. As with the other valves, the isolation valve can be automatically controlled by a controller or manually controlled in the various embodiments.

The self-delivering digester 100 can also include heating system 336 and a gas circulation or recirculation system 111. The heating system 336 can maintain a predetermined temperature, such as 95 degrees Fahrenheit or another desired temperature. For example, a controller can control a heating element of the heating system 336 to maintain the predetermined temperature. The heating can also be cycled on and off periodically or on a scheduled, and can be set to periodically vary between a high temperature and a low temperature. The heating system 336 can include a single heating element for both the primary vessel 103 and the secondary treatment vessel 109, or separate heating elements or sets of heating elements for each of the primary vessel 103 and the secondary treatment vessel 109. The heating system 336 can control the heat for the primary vessel 103 and the secondary treatment vessel 109 together or individually.

The gas recirculation system 111 can include a pump that is controlled by a controller to operate for a predetermined duration at a predetermined frequency (e.g., a duration of 5 minutes every two days). The pump can alternatively be controlled according to another periodic or non-periodic schedule. The gas recirculation system 111 can also include a double gas diaphragm pump that delivers two separate streams of recirculated gas to the primary waste vessel and the secondary vessel. The controller can separately control the streams of gas. The double gas diaphragm pump can eliminate any pressure issues with the gas recirculating pipes unequally dispersing gas into the stage two tank due to pressure differentials and other variables sensed within and between the two vessels.

In some examples, the self-delivering digester 100 can include polyisocyanurate foam insulation or another type of insulation. The insulation can be spray insulation or another type of insulation. The design can include delivering both floating solids and accumulated sludge to clear vessels where they can be removed by the end user. Gas circulation can operate every other day, otherwise periodically or on a predetermined schedule to force solids from the packed bed 319 into the top part of the primary tank where they can make their way into the secondary tank and then the clear solid capturing vessel that has a gas-tight screw top lid for occasional emptying. There can also be an outlet pipe at the bottom left of the primary tank where gas recirculation can aid in digested sludge making its way into the secondary treatment vessel for occasional removal.

Figure 4:
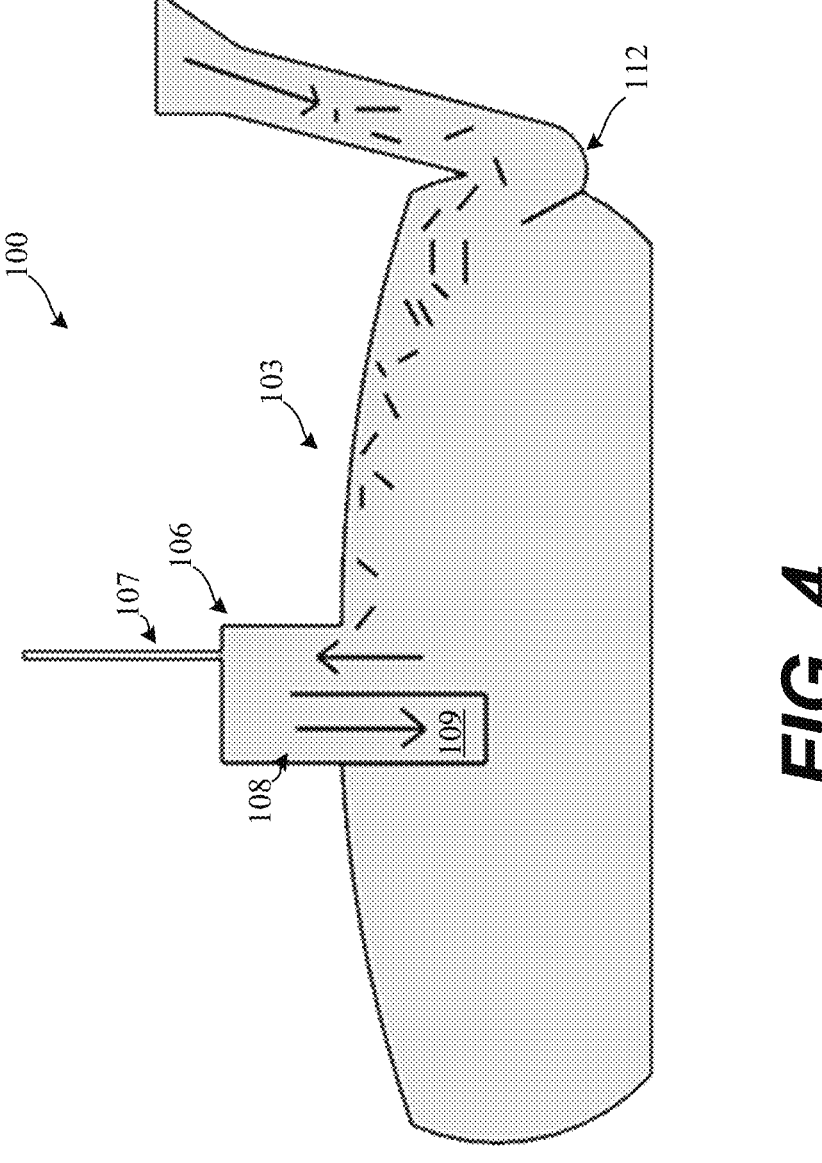
FIG. 4 is a drawing of another example of a self-delivering digester with self-delivery of accumulated solids, according to the present disclosure.

FIG. 4 illustrates another self-delivering digester 100 with self delivery of accumulated solids. While differing in shape from the example in FIG. 3, this alternative example of the self-delivering digester 100 can also include a primary vessel or primary waste vessel 103, a top-mounted or upper output component 106 with include a gas output path 107 and a solids output path 108, and a secondary treatment vessel 109, as well as a feeding port 112. As in the other examples, the physical structure of the self-delivering digester 100 can enable self-delivery of accumulated solids to the secondary treatment vessel 109. In this example, the secondary treatment vessel 109 can be periodically cleaned through a lid or other cleaning access opening. The secondary treatment vessel 109 can have a transparent section such as a viewing port or lid, or the secondary treatment vessel 109 itself can be transparent so that a level of floating solids can be seen.

The combined or integrated effluent and gas pipe configuration of the upper output component 106 allows for rising solids to be removed by the end user also has the ability to resolve clogging issues with manure fed digesters. Particularly in the case of bag style digesters, locating the effluent pipe in a centralized location at the top of the digester, and eliminating the gas space in the digester, can allow for straw and other lignin-based materials to rise from the effluent pipe during feeding.

The systems described can include controllers that electronically control aspects of the digesters including heating regulation, gas circulation, pressure regulation, and other functionalities. The functionalities can be performed using services, programs, and computer instructions for controllers and other components. The services, programs, and computer instructions can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure.

Therefore, we claim:

1. A self-delivering digester, comprising:
a primary waste vessel comprising a feeding port for kitchen waste; and
an upper output component that connects to a top of the primary waste vessel, the upper output component comprising:
   a gas output path from a top of the upper output component; and
   a floating solids output path that delivers floating solids that overflow from the top of the primary waste vessel to a secondary vessel; and
an upper collection container that collects secondary vessel floating solids from a top of the secondary vessel, the upper collection container comprising an openable lid that enables removal of the secondary vessel floating solids.

2. The self-delivering digester of claim 1, wherein the secondary vessel comprises an effluent output port or path.

3. The self-delivering digester of claim 1, wherein at least a portion of the upper collection container is transparent.

4. The self-delivering digester of claim 1, wherein the upper collection container comprises a secondary gas output path that collects gas from the upper collection container.

5. The self-delivering digester of claim 4, wherein the secondary gas output path comprises a valve that is closeable to isolate a gas system from the upper collection container when the openable lid is opened for removal of the secondary vessel floating solids.

6. The self-delivering digester of claim 1, further comprising a gas recirculation system that operates periodically or on a predetermined schedule.

7. The self-delivering digester of claim 6, wherein the gas recirculation system comprises a double gas diaphragm pump that delivers two separate streams of recirculated gas to the primary waste vessel and the secondary vessel.

8. The self-delivering digester of claim 1, wherein the secondary vessel is internal or external to the primary waste vessel.

9. A self-delivering digester, comprising:
a primary waste vessel comprising a feeding port for kitchen waste; and an upper output component that connects to a top of the primary waste vessel, the upper output component comprising:
   a gas output path from a top of the upper output component; and
   a floating solids output path that delivers floating solids that overflow from the top of the primary waste vessel to a secondary vessel; and
a lower collection container that collects sludge from a bottom of the secondary vessel.

10. The self-delivering digester of claim 9, wherein the lower collection container comprises a cleaning port or cleaning valve for sludge removal.

11. The self-delivering digester of claim 9, wherein at least a portion of the lower collection container is transparent.

12. The self-delivering digester of claim 9, wherein the primary waste vessel comprises a lower outlet that allows sludge to migrate to the secondary vessel.

13. The self-delivering digester of claim 9, wherein the primary waste vessel comprises an upper section and a lower section.

14. The self-delivering digester of claim 13, wherein the upper section and the lower section are connected through a packed bed comprising a u-shaped inlet tube.

15. The self-delivering digester of claim 9, wherein at least a portion of the self-delivering digester is insulated using polyisocyanurate foam.

16. The self-delivering digester of claim 9, further comprising at least one heating element that heats at least one of the primary waste vessel and the secondary vessel.

17. A system, comprising:
a primary vessel, wherein the primary waste vessel comprises an upper section and a lower section that are connected through a packed bed comprising a u-shaped inlet tube; and
an output component that connects to a top of the primary vessel, the output component comprising:
   a gas output path from a top of the output component; and
   a floating solids output path that delivers floating solids that overflow from the top of the primary vessel to a secondary vessel.

18. The system of claim 17, further comprising:
an upper collection container that collects secondary vessel floating solids from a top of the secondary vessel, the upper collection container comprising an openable lid that enables removal of the secondary vessel floating solids.

19. The system of claim 17, comprising a lower collection container that collects sludge from a bottom of the secondary vessel.

20. The system of claim 17, comprising a gas recirculation system that delivers two separate streams of recirculated gas to the primary waste vessel and the secondary vessel.

* * * * *